United States Patent
Asano et al.

(10) Patent No.: US 12,531,268 B2
(45) Date of Patent: Jan. 20, 2026

(54) SOLID ELECTROLYTE MATERIAL AND BATTERY USING SAME

(71) Applicant: Panasonic Intellectual Property Management Co., Ltd., Osaka (JP)

(72) Inventors: Tetsuya Asano, Nara (JP); Takashi Kubo, Hyogo (JP); Keita Mizuno, Aichi (JP); Akihiro Sakai, Nara (JP); Takehiro Tanaka, Hyogo (JP); Kensuke Wakasugi, Tokyo (JP); Tomoyuki Komori, Osaka (JP); Takahiro Hamada, Osaka (JP); Mikiya Fujii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 18/150,689

(22) Filed: Jan. 5, 2023

(65) Prior Publication Data

US 2023/0163352 A1    May 25, 2023

Related U.S. Application Data

(63) Continuation of application No. PCT/JP2021/021702, filed on Jun. 8, 2021.

(30) Foreign Application Priority Data

Jul. 22, 2020   (JP) .................... 2020-125316

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 2019/0088995 A1 | 3/2019 | Asano et al. | |
| 2020/0328462 A1* | 10/2020 | Asano | H01M 10/052 |
| 2020/0350626 A1 | 11/2020 | Matsumura et al. | |

FOREIGN PATENT DOCUMENTS

| | | |
|---|---|---|
| JP | 2011-129312 | 6/2011 |
| WO | 2011/073798 | 6/2011 |
| WO | 2018/025582 | 2/2018 |
| WO | 2019/146236 | 8/2019 |

OTHER PUBLICATIONS

International Search Report of PCT application No. PCT/JP2021/021702 dated Jul. 27, 2021.

* cited by examiner

*Primary Examiner* — Colin W. Slifka

(74) *Attorney, Agent, or Firm* — Greenblum & Bernstein, P.L.C.

(57) ABSTRACT

The solid electrolyte material of the present disclosure consists of Li, M1, M2, and X, wherein M1 is at least two selected from the group consisting of Ca, Mg, and Zn; M2 is at least one selected from the group consisting of Y, Gd, and Sm; and X is at least one selected from the group consisting of F, Cl, Br, and I.

5 Claims, 4 Drawing Sheets

SOLID ELECTROLYTE MATERIAL AND BATTERY USING SAME

BACKGROUND

1. Technical Field

The present disclosure relates to a solid electrolyte material and a battery using it.

2. Description of the Related Art

Japanese Unexamined Patent Application Publication No. 2011-129312 discloses an all-solid-state battery using a sulfide solid electrolyte.

International Publication No. WO 2018/025582 discloses a solid electrolyte material represented by a composition formula: $Li_{6-3z}Y_zX_6$ ($0<z<2$, $X=Cl$ or $Br$).

SUMMARY

One non-limiting and exemplary embodiment provides a solid electrolyte material having a high lithium-ion conductivity.

In one general aspect, the techniques disclosed here feature a solid electrolyte material consisting of Li, M1, M2, and X, wherein M1 is at least two selected from the group consisting of Ca, Mg, and Zn; M2 is at least one selected from the group consisting of Y, Gd, and Sm; and X is at least one selected from the group consisting of F, Cl, Br, and I.

The present disclosure provides a solid electrolyte material having a high lithium-ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
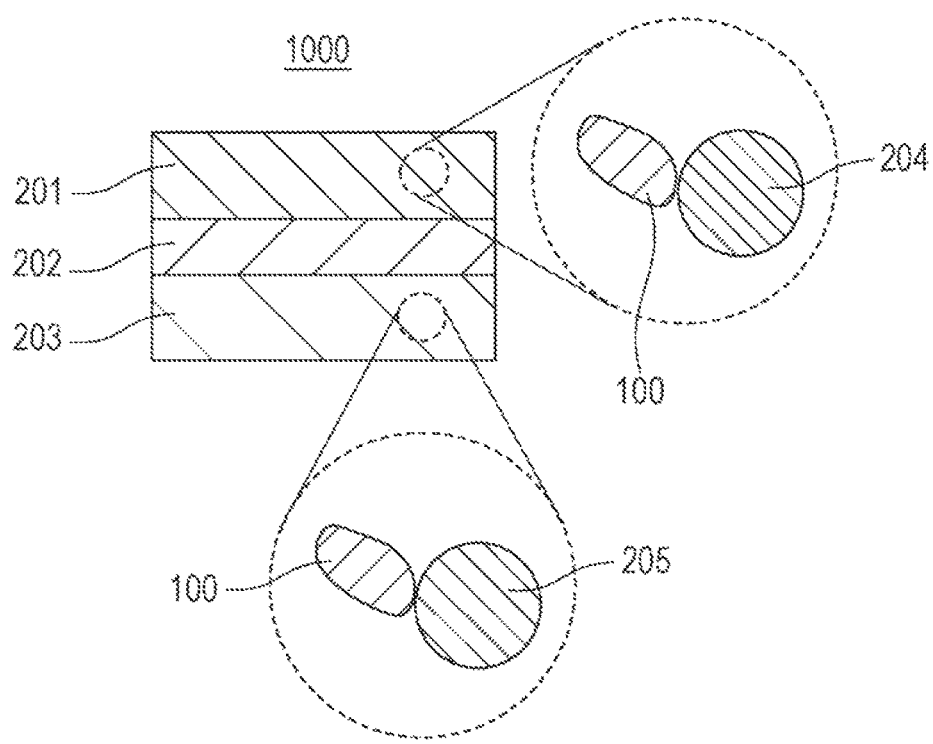
FIG. 1 shows a cross-sectional view of a battery 1000 according to a second embodiment.

Embodiments of the present disclosure will now be described with reference to the drawings.

First Embodiment

The solid electrolyte material according to a first embodiment consists of Li, M1, M2, and X. M1 is at least two selected from the group consisting of Ca, Mg, and Zn. M2 is at least one selected from the group consisting of Y, Gd, and Sm. X is at least one selected from the group consisting of F, Cl, Br, and I.

The solid electrolyte material according to the first embodiment has a high lithium-ion conductivity. Here, the high lithium-ion conductivity is, for example, 1 mS/cm or more at around room temperature. That is, the solid electrolyte material according to the first embodiment can have, for example, an ion conductivity of 1 mS/cm or more.

The solid electrolyte material according to the first embodiment can be used for obtaining a battery having excellent charge and discharge characteristics. An example of the battery is an all-solid-state battery. The all-solid-state battery may be a primary battery or a secondary battery.

Desirably, the solid electrolyte material according to the first embodiment does not essentially contain sulfur. The fact that the solid electrolyte material according to the first embodiment does not essentially contain sulfur means that the solid electrolyte material does not contain sulfur as a constituent element, except for sulfur inevitably mixed as an impurity. In this case, the amount of the sulfur mixed as an impurity in the solid electrolyte material is, for example, 1 mol % or less. The solid electrolyte material according to the first embodiment desirably does not contain sulfur. A solid electrolyte material not containing sulfur does not generate hydrogen sulfide, even if it is exposed to the atmosphere, and is therefore excellent in safety. The sulfide solid electrolyte disclosed in PTL 1 may generate hydrogen sulfide when exposed to the atmosphere.

The solid electrolyte material according to the first embodiment may contain an element that is unavoidably mixed. Examples of the element are hydrogen, oxygen, and nitrogen. These elements may be present in the raw material powders of the solid electrolyte material or in the atmosphere for manufacturing or storing the solid electrolyte material.

In order to enhance the ion conductivity of the solid electrolyte material, M1 may be Ca and Mg or may be Ca and Zn.

In order to enhance the ion conductivity of the solid electrolyte material, M2 may include Y.

In order to enhance the ion conductivity of the solid electrolyte material, X may be at least one selected from the group consisting of Cl and Br.

The solid electrolyte material according to the first embodiment may be a material represented by the following composition formula (1):

$$Li_{3-2a-3b}(Ca_{1-x}M1'_x)_a(Y_{1-y}M2'_y)_{1+b}Br_{6-z}Cl_z \qquad (1)$$

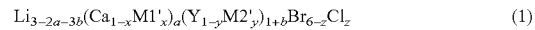

here,

M1' is at least one selected from the group consisting of Zn and Mg,

M2' is at least one selected from the group consisting of Gd and Sm, and the following five mathematical expressions:

$0<a\leq0.3$, $0\leq b\leq0.1$, $0<x\leq0.5$, $0\leq y\leq0.9$, and $0\leq z\leq6$ are satisfied. The material represented by the composition formula (1) has a high ion conductivity.

In order to enhance the ion conductivity of the solid electrolyte material, in the composition formula (1), the mathematical expression: $3\leq z\leq4.5$ may be satisfied.

The upper limit and lower limit of the range of "a" in the composition formula (1) may be provided by an arbitrary combination selected from numerical values of higher than 0 (i.e., 0<a), 0.05, 0.1, 0.15, 0.2, and 0.3.

The upper limit and lower limit of the range of "b" in the composition formula (1) may be provided by an arbitrary combination selected from numerical values of 0, 0.05, and 0.1.

The upper limit and lower limit of the range of "x" in the composition formula (1) may be provided by an arbitrary combination selected from numerical values of higher than 0 (i.e., 0<x), 0.1, 0.2, 0.3, and 0.5.

The upper limit and lower limit of the range of "y" in the composition formula (1) may be provided by an arbitrary combination selected from numerical values of 0, 0.1, 0.2, 0.4, 0.5, 0.6, 0.7, 0.8, and 0.9.

The upper limit and lower limit of the range of "z" in the composition formula (1) may be provided by an arbitrary combination selected from numerical values of 3, 3.5, 4, and 4.5.

The X-ray diffraction pattern of the solid electrolyte material according to the first embodiment can be obtained by X-ray diffraction measurement by a θ-2θ method using Cu-Kα rays (wavelength: 1.5405 angstrom and 1.5444 angstrom, i.e., wavelength: 0.15405 nm and 0.15444 nm). In the resulting X-ray diffraction pattern, a first peak may be present in a diffraction angle 2θ range of 30.0° or more and 31.0° or less, and a second peak may be present in a diffraction angle 2θ range of 39.0° or more and 40.3° or less. Furthermore, a third peak may be present in a diffraction angle 2θ range of 15.0° or more and 15.7° or less, a fourth peak may be present in a diffraction angle 2θ range of 16.3° or more and 17.1° or less, and a fifth peak may be present in a diffraction angle 2θ range of 46.6° or more and 48.1° or less. A crystal phase having these peaks is called first crystal phase. A solid electrolyte material containing a first crystal phase has a high ion conductivity.

The first crystal phase is attributed to a trigonal crystal. The "trigonal crystal" in the present disclosure has a crystal structure similar to $Li_3ErCl_6$ disclosed in the inorganic crystal structure database (ICSD) Collection Code 50151 and means a crystal phase having an X-ray diffraction pattern unique to this structure. In the present disclosure, "having a similar crystal structure" means being classified in the same space group and having a familiar atomic arrangement structure and does not limit the lattice constant.

The solid electrolyte material according to the first embodiment may further contain a second crystal phase different from the first crystal phase. That is, the solid electrolyte material according to the first embodiment may further contain a second crystal phase where a peak is present outside the above-described diffraction angle 2θ range. The second crystal phase may be interposed between the first crystal phases.

The shape of the solid electrolyte material according to the first embodiment is not limited. Examples of the shape are needle, spherical, and oval spherical shapes. The solid electrolyte material according to the first embodiment may be a particle. The solid electrolyte material according to the first embodiment may be formed so as to have a pellet or planar shape.

When the shape of the solid electrolyte material according to the first embodiment is, for example, a particulate shape (e.g., spherical), the solid electrolyte material may have a median diameter of 0.1 μm or more and 100 μm or less. The median diameter means the particle diameter at which the accumulated volume in a volume-based particle size distribution is equal to 50%. The volume-based particle size distribution is measured with, for example, a laser diffraction measurement apparatus or an image analyzer.

The solid electrolyte material according to the first embodiment may have a median diameter of 0.5 μm or more and 10 μm or less. Consequently, the solid electrolyte material according to the first embodiment has a higher ion conductivity. Furthermore, when the solid electrolyte material according to the first embodiment is mixed with another material such as an active material, the solid electrolyte material according to the first embodiment and the other material are well dispersed.

Method for Manufacturing Solid Electrolyte Material

The solid electrolyte material according to the first embodiment is manufactured by, for example, the following method.

Raw material powders are provided so as to give a target composition and are mixed. The raw material powders may be, for example, halides.

As an example, when the target composition is $Li_{2.6}Ca_{0.18}Zn_{0.02}Y_{0.3}Gd_{0.7}Br_{2.5}Cl_{3.5}$, a LiCl raw material powder, a LiBr raw material powder, a $CaBr_2$ raw material powder, a $ZnBr_2$ raw material powder, an $YBr_3$ raw material powder, and a $GdCl_3$ raw material powder (i.e., raw material powders of six halides) are mixed such that the LiCl:LiBr:$CaBr_2$:$ZnBr_2$:$YBr_3$:$GdCl_3$ molar ratio is about 1.4:1.2:0.18:0.02:0.3:0.7. The raw material powders may be mixed at a molar ratio adjusted in advance so as to offset a composition change that may occur in the synthesis process.

A mixture of the raw material powders is heat-treated in an inert gas atmosphere and is allowed to react with each other to obtain a reaction product. Examples of the inert gas include helium, nitrogen, and argon. The heat treatment may be performed in a vacuum. In the heat treatment process, a mixture of the raw material powders may be placed in a container (e.g., a crucible or a vacuum-sealed tube) and heat-treated in a heating furnace.

Alternatively, the raw material powders may be mechanochemically reacted with each other in a mixer, such as a planetary ball mill, to obtain a reaction product. That is, the raw material powders may be mixed and reacted with each other using a mechanochemical method. The thus-obtained reaction product may be further heat-treated in an inert gas atmosphere or in a vacuum.

The solid electrolyte material according to the first embodiment is obtained by these methods.

Second Embodiment

A second embodiment will now be described. The matters described in the first embodiment may be appropriately omitted.

In the second embodiment, an electrochemical device using the solid electrolyte material according to the first embodiment is described. As the electrochemical device according to the second embodiment, a battery will now be described.

The battery according to the second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte material according to the first embodiment.

The battery according to the second embodiment contains the solid electrolyte material according to the first embodiment and therefore has excellent charge and discharge characteristics. The battery may be an all-solid-state battery.

FIG. 1 shows a cross-sectional view of a battery 1000 according to the second embodiment.

The battery 1000 according to the second embodiment includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material. The electrolyte material is, for example, a solid electrolyte material.

The negative electrode 203 contains a negative electrode active material particle 205 and a solid electrolyte particle 100.

The solid electrolyte particle 100 is a particle consisting of the solid electrolyte according to the first embodiment or a particle containing the solid electrolyte material according to the first embodiment as a main component. Here, the particle containing the solid electrolyte material according to the first embodiment as a main component means a particle in which the most abundant component in terms of mass ratio is the solid electrolyte material according to the first embodiment. The solid electrolyte particle 100 may be a particle consisting of the solid electrolyte material according to the first embodiment.

The positive electrode 201 contains a material that can occlude and release metal ions such as lithium ions. The material is, for example, a positive electrode active material (for example, the positive electrode active material particle 204).

Examples of the positive electrode active material are a lithium-containing transition metal oxide, a transition metal fluoride, a polyanionic material, a fluorinated polyanionic material, a transition metal sulfide, a transition metal oxyfluoride, a transition metal oxysulfide, and a transition metal oxynitride. Examples of the lithium-containing transition metal oxide are $Li(Ni,Co,Al)O_2$ and $LiCoO_2$.

In the present disclosure, the notation "(A,B,C)" in a chemical formula means "at least one selected from the group consisting of A, B, and C". The same is true for other elements.

The positive electrode active material particle 204 may have a median diameter of 0.1 μm or more and 100 μm or less. When the positive electrode active material particle 204 has a median diameter of 0.1 μm or more, the positive electrode active material particle 204 and the solid electrolyte particle 100 are well dispersed in the positive electrode 201. Consequently, the charge and discharge characteristics of the battery are improved. When the positive electrode active material particle 204 has a median diameter of 100 μm or less, the lithium diffusion speed in the positive electrode active material particle 204 is increased. Consequently, the battery can be operated at a high output.

The positive electrode active material particle 204 may have a median diameter larger than that of the solid electrolyte particle 100. Consequently, the positive electrode active material particle 204 and the solid electrolyte particle 100 are well dispersed in the positive electrode 201.

In order to increase the energy density and output of the battery, in the positive electrode 201, the ratio of the volume of the positive electrode active material particle 204 to the sum of the volumes of the positive electrode active material particle 204 and the solid electrolyte particle 100 may be 0.30 or more and 0.95 or less.

In order to increase the energy density and output of the battery, the positive electrode 201 may have a thickness of 10 μm or more and 500 μm or less.

The electrolyte layer 202 contains an electrolyte material. The electrolyte material is, for example, a solid electrolyte material. The electrolyte layer 202 may be a solid electrolyte layer.

The electrolyte layer 202 may contain the solid electrolyte material according to the first embodiment. The electrolyte layer 202 may be constituted of only the solid electrolyte material according to the first embodiment. Alternatively, the electrolyte layer 202 may be constituted of only a solid electrolyte material that is different from the solid electrolyte material according to the first embodiment.

Examples of the solid electrolyte material that is different from the solid electrolyte material according to the first embodiment are $Li_2MgX'_4$, $Li_2FeX'_4$, $Li(Al,Ga,In)X'_4$, $Li_3(Al,Ga,In)X'_6$, and LiI. Here, X' is at least one selected from the group consisting of F, Cl, Br, and I.

Hereinafter, the solid electrolyte material according to the first embodiment is called a first solid electrolyte material. The solid electrolyte material that is different from the solid electrolyte material according to the first embodiment is called a second solid electrolyte material.

The electrolyte layer 202 may contain not only the first solid electrolyte material but also the second solid electrolyte material. The first solid electrolyte material and the second solid electrolyte material may be uniformly dispersed in the electrolyte layer 202. A layer consisting of the first solid electrolyte material and a layer consisting of the second solid electrolyte material may be stacked along the stacking direction of the battery 1000.

The electrolyte layer 202 may have a thickness of 1 μm or more and 1000 μm or less. When the electrolyte layer 202 has a thickness of 1 μm or more, short-circuiting hardly occurs between the positive electrode 201 and the negative electrode 203. When the electrolyte layer 202 has a thickness of 1000 μm or less, the battery can be operated at a high output.

The negative electrode 203 contains a material that can occlude and release metal ions such as lithium ions. The material is, for example, a negative electrode active material (for example, the negative electrode active material particle 205).

Examples of the negative electrode active material are a metal material, a carbon material, an oxide, a nitride, a tin compound, and a silicon compound. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. From the viewpoint of capacity density, suitable examples of the negative electrode active material are silicon (Si), tin (Sn), a silicon compound, and a tin compound.

The negative electrode active material particle 05 may have a median diameter of 0.1 μm or more and 100 μm or less. When the negative electrode active material particle 205 has a median diameter of 0.1 μm or more, the negative electrode active material particle 205 and the solid electrolyte particle 100 are well dispersed in the negative electrode 203. Consequently, the charge and discharge characteristics of the battery are improved. When the negative electrode active material particle 205 has a median diameter of 100 μm or less, the lithium diffusion speed in the negative electrode active material particle 205 is improved. Consequently, the battery can be operated at a high output.

The negative electrode active material particle 205 may have a median diameter larger than that of the solid electrolyte particle 100. Consequently, the negative electrode active material particle 205 and the solid electrolyte particle 100 can be well dispersed in the negative electrode 203.

In order to increase the energy density and output of the battery, in the negative electrode 203, the ratio of the volume of the negative electrode active material particle 205 to the sum of the volumes of the negative electrode active material particle 205 and the solid electrolyte particle 100 may be 0.30 or more and 0.95 or less.

In order to increase the energy density and output of the battery, the negative electrode 203 may have a thickness of 10 μm or more and 500 μm or less.

At least one selected from the group consisting of the positive electrode 201, the electrolyte layer 202, and the negative electrode 203 may contain the second solid electrolyte material for the purpose of enhancing the ion conductivity, chemical stability, and electrochemical stability.

As described above, the second solid electrolyte material may be a halide solid electrolyte.

Examples of the halide solid electrolyte are $Li_2MgX'_4$, $Li_2FeX'_4$, $Li(Al,Ga,In)X'_4$, $Li_3(Al,Ga,In)X'_6$, and LiI. Here, X' is at least one selected from the group consisting of F, Cl, Br, and I.

The second solid electrolyte material may be a sulfide solid electrolyte.

Examples of the sulfide solid electrolyte are $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte are:
(i) an NASICON-type solid electrolyte, such as $LiTi_2(PO_4)_3$ or its element substitute;
(ii) a perovskite-type solid electrolyte, such as (LaLi)$TiO_3$;
(iii) an LISICON-type solid electrolyte, such as $Li_{14}ZnGe_4O_{16}$, $Li_4SiO_4$, $LiGeO_4$, or its element substitute;
(iv) a garnet-type solid electrolyte, such as $Li_7La_3Zr_2O_{12}$ or its element substitute; and
(v) $Li_3PO_4$ or its N-substitute.

The second solid electrolyte material may be an organic polymer solid electrolyte.

Examples of the organic polymer solid electrolyte are a polymer compound and a compound of a lithium salt. The polymer compound may have an ethylene oxide structure. A polymer compound having an ethylene oxide structure can contain a large amount of a lithium salt and can therefore further enhance the ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used.

At least one selected from the group consisting of the positive electrode 201, the electrolyte layer 202, and the negative electrode 203 may contain a nonaqueous electrolyte liquid, a gel electrolyte, or an ionic liquid for the purpose of facilitating the transfer of lithium ions and improving the output characteristics of the battery.

The nonaqueous electrolyte liquid includes a nonaqueous solvent and a lithium salt dissolved in the nonaqueous solvent.

Examples of the nonaqueous solvent are a cyclic carbonate solvent, a chain carbonate solvent, a cyclic ether solvent, a chain ether solvent, a cyclic ester solvent, a chain ester solvent, and a fluorine solvent. Examples of the cyclic carbonate solvent are ethylene carbonate, propylene carbonate, and butylene carbonate. Examples of the chain carbonate solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is methyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these solvents may be used alone. Alternatively, a mixture of two or more nonaqueous solvents selected from these solvents may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used. The concentration of the lithium salt is, for example, 0.5 mol/L or more and 2 mol/L or less.

As the gel electrolyte, a polymer material impregnated with a nonaqueous electrolyte liquid can be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:
(i) an aliphatic chain quaternary salt, such as tetraalkylammonium and tetraalkylphosphonium;
(ii) an alicyclic ammonium, such as pyrrolidiniums, morpholiniums, imidazoliniums, tetrahydropyrimidiniums, piperaziniums, and piperidiniums; and
(iii) a nitrogen-containing heterocyclic aromatic cation, such as pyridiniums and imidazoliums.

Examples of the anion included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3$.

The ionic liquid may contain a lithium salt.

At least one selected from the group consisting of the positive electrode 201, the electrolyte layer 202, and the negative electrode 203 may contain a binder for the purpose of improving the adhesion between individual particles.

Examples of the binder are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. A copolymer can also be used as the binder. Examples of such the binder are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these materials may be used as the binder.

At least one selected from the positive electrode 201 and the negative electrode 203 may contain a conductive assistant for enhancing the electron conductivity.

Examples of the conductive assistant are:
(i) graphites, such as natural graphite and artificial graphite;
(ii) carbon blacks, such as acetylene black and Ketjen black;
(iii) conductive fibers, such as carbon fibers and metal fibers;
(iv) carbon fluoride;
(v) metal powders, such as aluminum;
(vi) conductive whiskers, such as zinc oxide and potassium titanate;
(vii) a conductive metal oxide, such as titanium oxide; and
(viii) a conductive polymer compound, such as polyaniline, polypyrrole, and polythiophene. In order to reduce the cost, the conductive assistant of the above (i) or (ii) may be used.

Examples of the shape of the battery according to the second embodiment are a coin type, a cylindrical type, a square type, a sheet type, a button type, a flat type, and a stack type.

The battery according to the second embodiment may be manufactured by, for example, preparing a material for forming a positive electrode, a material for forming an electrolyte layer, and a material for forming a negative electrode and producing a stack composed of a positive electrode, an electrolyte layer, and a negative electrode arranged in this order by a known method.

EXAMPLES

The present disclosure will now be described in more detail with reference to Examples and Comparative Examples.

Example 1

Production of Solid Electrolyte Material

LiCl, LiBr, CaBr$_2$, ZnBr$_2$, YBr$_3$, and GdCl$_3$ were provided as raw material powders in an argon atmosphere having a dew point of −60° C. or less (hereinafter, referred to as "dry argon atmosphere") at a LiCl:LiBr:CaBr$_2$:ZnBr$_2$:YBr$_3$:GdCl$_3$ molar ratio of 1.4:1.2:0.18:0.02:0.3:0.7. These raw material powders were pulverized and mixed in an agate mortar. The resulting mixture was put in an alumina crucible and was heat-treated at 500° C. for 1 hour in the dry argon atmosphere. The resulting heat treatment product was pulverized in an agate mortar. Thus, a solid electrolyte material powder of Example 1 was obtained. The solid electrolyte material of Example 1 had a composition represented by Li$_{2.6}$Ca$_{0.18}$Zn$_{0.02}$Y$_{0.3}$Gd$_{0.7}$Br$_{2.5}$Cl$_{3.5}$.

Evaluation of Ion Conductivity

Figure 2:
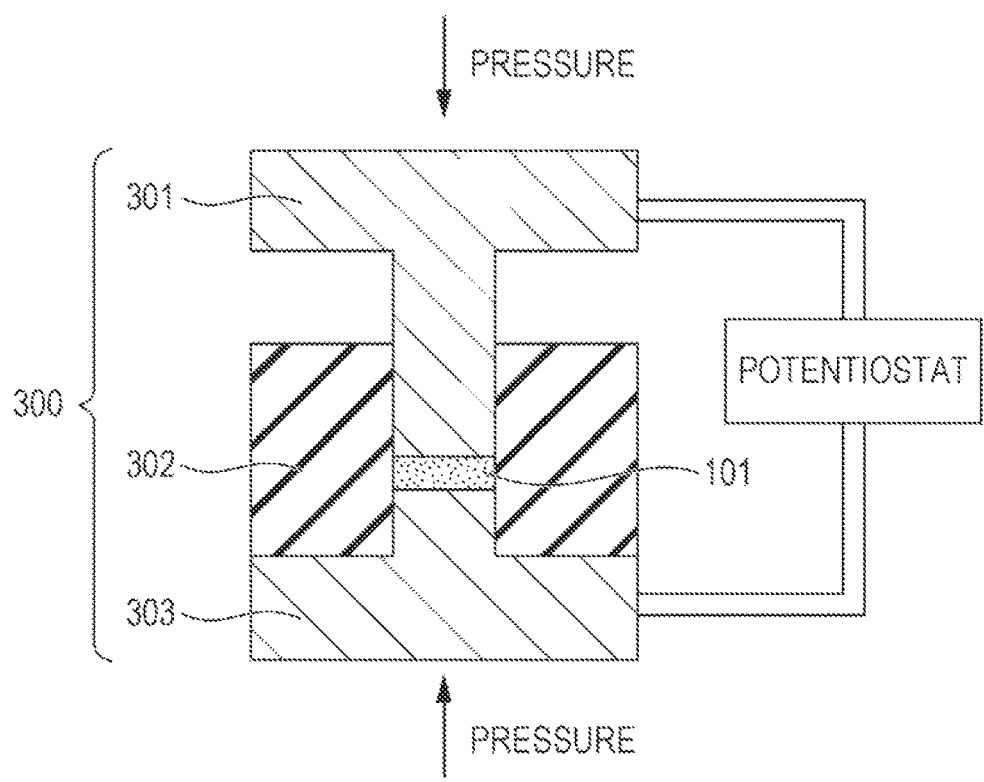
FIG. 2 shows a schematic view of a compression molding dies 300 used for evaluation of the ion conductivity of a solid electrolyte material.

FIG. 2 shows a schematic view of a compression molding dies 300 used for evaluation of the ion conductivity of a solid electrolyte material.

The compression molding dies 300 included a punch upper part 301, a die 302, and a punch lower part 303. The punch upper part 301 and the punch lower part 303 were both made of electron-conductive stainless steel. The die 302 was made of insulating polycarbonate.

The ion conductivity of the solid electrolyte material of Example 1 was evaluated using the compression molding dies 300 shown in FIG. 2 as below.

The powder 101 of the solid electrolyte material of Example 1 was filled in the compression molding dies 300 in the dry argon atmosphere. A pressure of 360 MPa was applied to the powder 101 of the solid electrolyte material of Example 1 inside the compression molding dies 300 using the punch upper part 301 and the punch lower part 303.

While applying the pressure, the punch upper part 301 and the punch lower part 303 were connected to a potentiostat (Princeton Applied Research, VersaSTAT4) loaded with a frequency response analyzer. The punch upper part 301 was connected to the working electrode and the potential measurement terminal. The punch lower part 303 was connected to the counter electrode and the reference electrode. The impedance of the solid electrolyte material was measured by an electrochemical impedance measurement method at room temperature.

Figure 3:
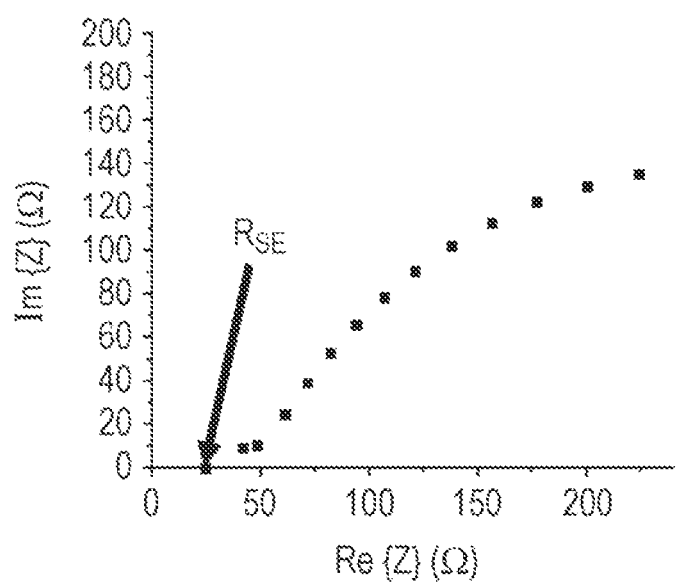
FIG. 3 is a graph showing Cole-Cole plots obtained from the results of AC impedance measurement of the solid electrolyte material of Example 1.

FIG. 3 is a graph showing Cole-Cole plots obtained by impedance measurement of the solid electrolyte material of Example 1.

In FIG. 3, the real value of impedance at the measurement point where the absolute value of the phase of complex impedance was the smallest was regarded as the resistance value of the solid electrolyte material of Example 1 to ion conduction. Regarding the real value, see the arrow R$_{SE}$ shown in FIG. 3. The ion conductivity was calculated using the resistance value based on the following mathematical expression (2):

$$\sigma = (R_{SE} \times S/t)^{-1} \qquad (2).$$

Here, σ represents ion conductivity; S represents the contact area of a solid electrolyte material with the punch upper part 301 (equal to the cross-sectional area of the hollow part of the die 302 in FIG. 2); R$_{SE}$ represents the resistance value of the solid electrolyte material in impedance measurement; and t represents the thickness of the solid electrolyte material (i.e., in FIG. 2, the thickness of the layer formed from the powder 101 of the solid electrolyte material).

The ion conductivity of the solid electrolyte material of Example 1 measured at 25° C. was 2.49 mS/cm.

X-Ray Diffraction Measurement

Figure 4:
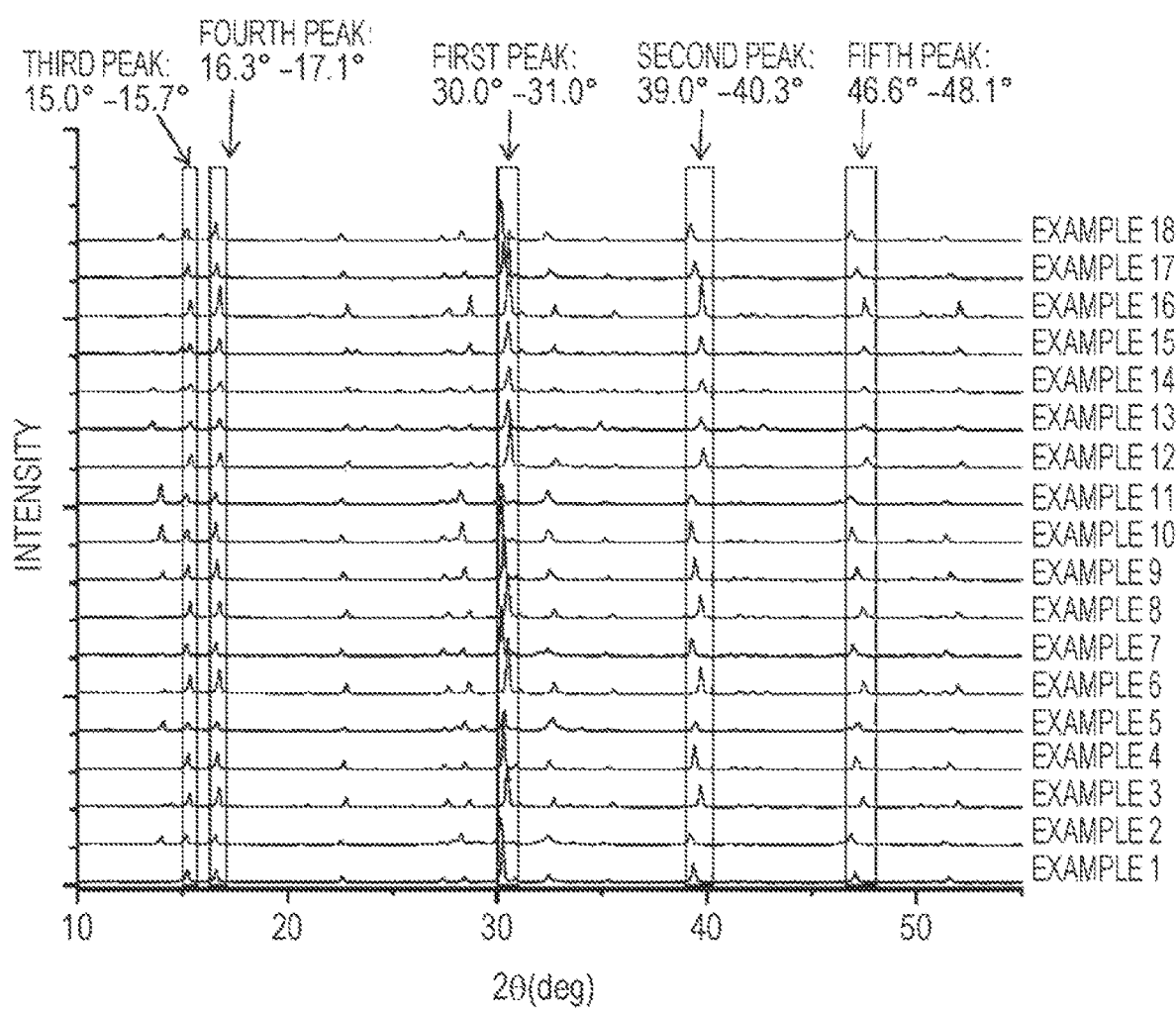
FIG. 4 is a graph showing X-ray diffraction patterns of the solid electrolyte materials of Examples 1 to 18.

FIG. 4 is a graph showing an X-ray diffraction pattern of the solid electrolyte material of Example 1.

The X-ray diffraction pattern of the solid electrolyte material of Example 1 was measured by a θ-2θ method in a dry environment having a dew point of −50° C. or less with an X-ray diffractometer (RIGAKU Corporation, MiniFlex 600). As the X-ray source, Cu-Kα rays (wavelength: 1.5405 angstrom and 1.5444 angstrom) were used.

In the X-ray diffraction pattern of the solid electrolyte material of Example 1, peaks were present at 30.25° (i.e., first peak) and 39.37° (i.e., second peak). Furthermore, peaks were present also at 15.24° (i.e., third peak), 16.62° (i.e., fourth peak), and 47.05° (i.e., fifth peak). Accordingly, the solid electrolyte material according to the first embodiment contained a first crystal phase (i.e., trigonal crystal).

Production of Battery

The solid electrolyte material of Example 1 and LiCoO$_2$ were provided at a volume ratio of 30:70 in the dry argon atmosphere. These materials were mixed in a mortar to obtain a mixture.

The solid electrolyte material (80 mg) of Example 1 and the above mixture (10 mg) were stacked in this order in an insulating tube having an inner diameter of 9.5 mm. A pressure of 720 MPa was applied to the resulting stack to form a solid electrolyte layer and a first electrode. The solid electrolyte layer had a thickness of 400 μm.

Subsequently, metal In (thickness: 200 μm), metal Li (thickness: 200 μm), and metal In (thickness: 200 μm) were stacked in order on the solid electrolyte layer. A pressure of 80 MPa was applied to the resulting stack to form a second electrode.

Subsequently, a current collector made of stainless steel was attached to the first electrode and the second electrode, and a current collecting lead was attached to the current collector.

Finally, the inside of the insulating tube was isolated from the outside atmosphere using an insulating ferrule to seal the inside of the tube. Thus, a battery of Example 1 was obtained.

Charge and Discharge Test

Figure 6:
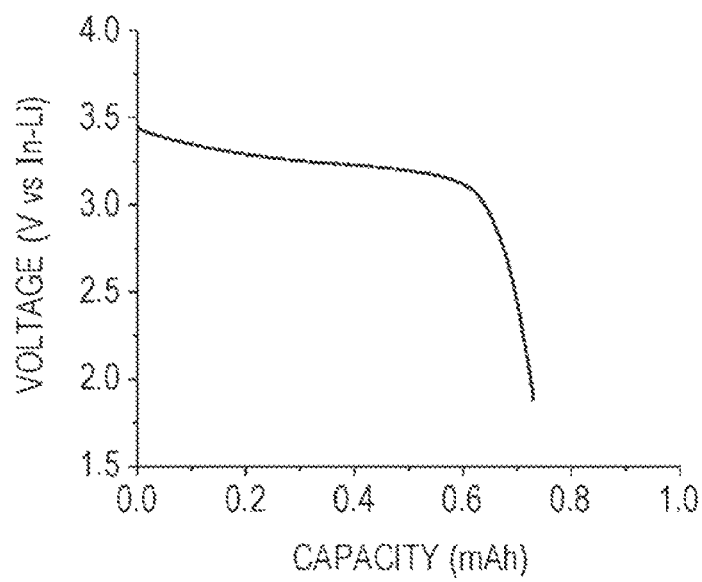
FIG. 6 is a graph showing the initial discharge characteristics of the battery of Example 1.

FIG. 6 is a graph showing the initial discharge characteristics of the battery of Example 1. The initial discharge characteristics were measured as follows.

The battery of Example 1 was placed in a thermostat of 25° C.

The battery of Example 1 was charged at a current density of 76 μA/cm² until a voltage of 3.68 V was reached. The current density corresponds to 0.05 C rate.

Subsequently, the battery of Example 1 was discharged at a current density of 76 μA/cm² until a voltage of 1.88 V was reached.

As the results of the charge and discharge test, the battery of Example 1 had an initial discharge capacity of 0.73 mAh.

Examples 2 to 37

Production of Solid Electrolyte Material

Solid electrolyte materials of Examples 2 to 37 were obtained as in Example 1 except for the types and molar ratios of the raw material powders. The types and molar ratios of the raw material powders are shown in Table 1.

The compositions of the solid electrolyte materials of Examples 2 to 37 are shown in Table 2. The values corresponding to a, b, x, y, and z of the composition formula (1) and the elements of M1 and M2 are shown in Table 2.

Evaluation of Ion Conductivity

The ion conductivities of the solid electrolyte materials of Examples 2 to 37 were measured as in Example 1. The measurement results are shown in Table 2.

X-Ray Diffraction Measurement

The X-ray diffraction patterns of the solid electrolyte materials of Examples 2 to 37 were measured as in Example 1.

Figure 5:
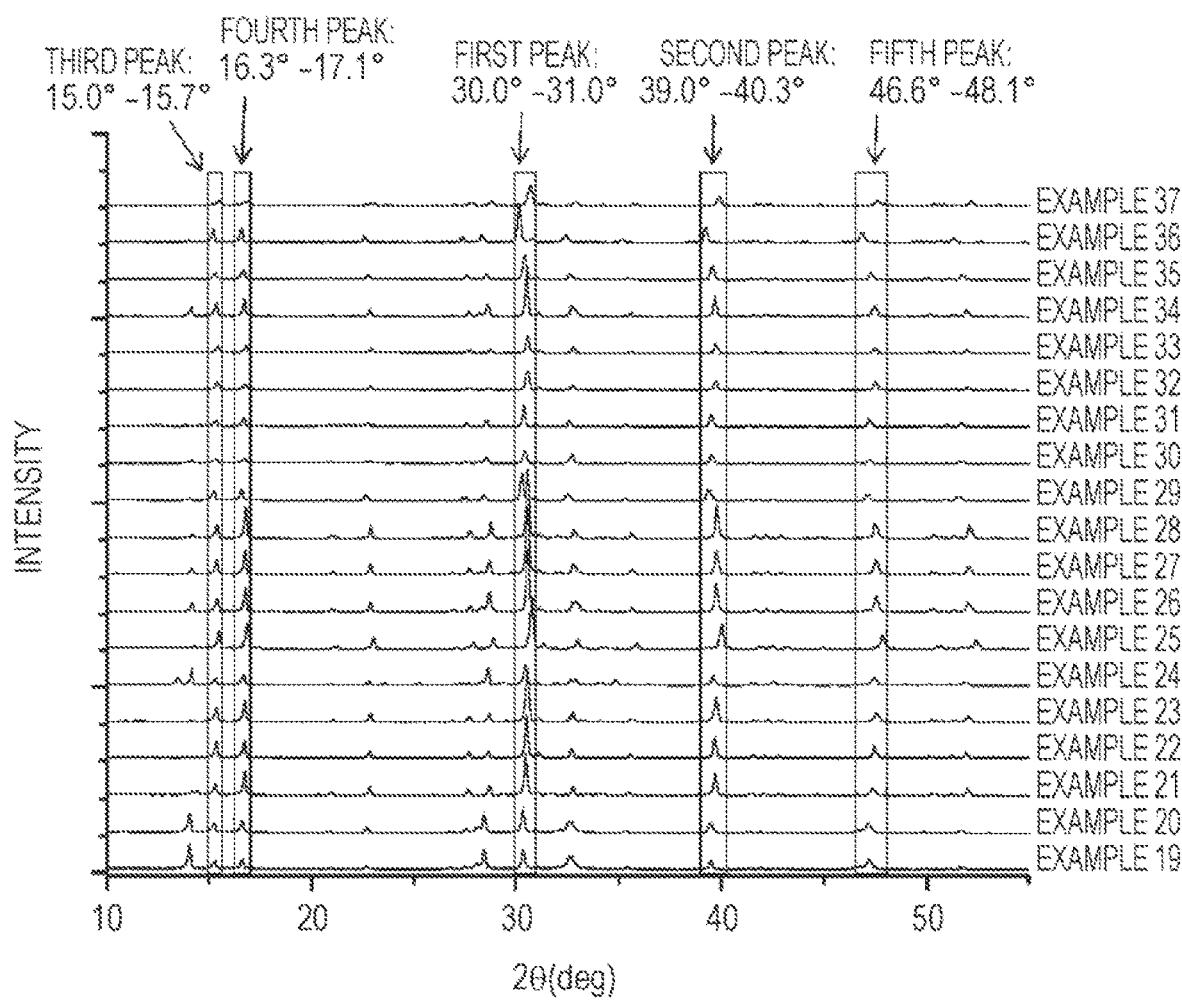
FIG. 5 is a graph showing X-ray diffraction patterns of the solid electrolyte materials of Examples 19 to 37.

FIG. 4 is a graph showing X-ray diffraction patterns of the solid electrolyte materials of Examples 1 to 18. FIG. 5 is a graph showing X-ray diffraction patterns of the solid electrolyte materials of Examples 19 to 37. The observed angles of X-ray diffraction peaks are shown in Table 3. As shown in FIGS. 4 and 5, all the solid electrolyte materials of Examples 1 to 37 contained a first crystal phase.

Charge and Discharge Test

Batteries of Examples 2 to 37 were obtained as in Example 1 using the solid electrolyte materials of Examples 2 to 37. A charge and discharge test was performed as in Example 1 using the batteries of Examples 2 to 37. As a result, the batteries of Examples 2 to 37 were well charged and discharged as in the battery of Example 1.

Comparative Examples 1 and 2

Production of Solid Electrolyte Material

Solid electrolyte materials of Comparative Examples 1 and 2 were obtained as in Example 1 except for the types and molar ratios of the raw material powders. The types and molar ratios of the raw material powders are shown in Table 1.

The compositions of the solid electrolyte materials of Comparative Examples 1 and 2 are shown in Table 2. The values corresponding to a, b, x, y, and z of the composition formula (1) and the elements of M1 and M2 are shown in Table 2.

Evaluation of Ion Conductivity

The ion conductivities of the solid electrolyte materials of Comparative Examples 1 and 2 were measured as in Example 1. The measurement results are shown in Table 2.

TABLE 1

| | Raw material powder (molar ratio) | | | | | | | | | | | | |
|---|---|---|---|---|---|---|---|---|---|---|---|---|---|
| | LiCl | LiBr | CaCl$_2$ | CaBr$_2$ | ZnCl$_2$ | ZnBr$_2$ | MgCl$_2$ | MgBr$_2$ | YCl$_3$ | YBr$_3$ | GdCl$_3$ | SmCl$_3$ | SmBr$_3$ |
| Example 1 | 1.4 | 1.2 | — | 0.18 | — | 0.02 | — | — | — | 0.3 | 0.7 | — | — |
| Example 2 | 1.2 | 1.5 | — | 0.12 | — | 0.03 | — | — | — | 0.4 | 0.6 | — | — |
| Example 3 | 0.55 | 2 | 0.075 | — | 0.075 | — | — | — | 0.525 | 0 | 0.525 | — | — |
| Example 4 | 1.4 | 1.3 | — | 0.135 | — | 0.015 | — | — | — | 0.3 | 0.7 | — | — |
| Example 5 | 1.7 | 1.2 | — | 0.035 | — | 0.015 | — | — | — | 0.4 | 0.6 | — | — |
| Example 6 | 0.9 | 2 | 0.025 | — | 0.025 | — | — | — | 0.5 | — | 0.5 | — | — |
| Example 7 | 1.2 | 1.2 | — | 0.15 | 0.15 | — | — | — | — | 0.5 | 0.5 | — | — |
| Example 8 | 2.2 | 0.5 | — | 0.12 | — | 0.03 | — | — | — | 0.4 | 0.6 | — | — |
| Example 9 | 1.7 | 1.1 | — | 0.08 | — | 0.02 | — | — | — | 0.4 | 0.6 | — | — |
| Example 10 | 1.3 | 1.3 | — | 0.1 | 0.1 | — | — | — | — | 0.5 | 0.5 | — | — |
| Example 11 | 0.3 | 2.6 | — | 0.025 | — | 0.025 | — | — | — | 0.1 | 0.9 | — | — |
| Example 12 | 2.7 | — | 0.12 | — | 0.03 | — | — | — | 0.333 | 0.567 | — | — | 0.1 |
| Example 13 | 0.5 | 2 | 0.05 | — | 0.05 | — | — | — | 0.55 | — | — | 0.55 | — |
| Example 14 | 0.6 | 2 | 0.1 | — | 0.1 | — | — | — | 0.5 | — | — | 0.5 | — |
| Example 15 | 0.8 | 2 | 0.05 | — | 0.05 | — | — | — | 0.5 | — | — | 0.5 | — |

TABLE 1-continued

| | Raw material powder (molar ratio) | | | | | | | | | | | | |
|---|---|---|---|---|---|---|---|---|---|---|---|---|---|
| | LiCl | LiBr | CaCl$_2$ | CaBr$_2$ | ZnCl$_2$ | ZnBr$_2$ | MgCl$_2$ | MgBr$_2$ | YCl$_3$ | YBr$_3$ | GdCl$_3$ | SmCl$_3$ | SmBr$_3$ |
| Example 16 | 0.6 | 2 | 0.1 | — | 0.1 | — | — | — | 1 | — | — | — | — |
| Example 17 | 1.4 | 1.4 | — | 0.08 | — | — | 0.02 | — | 0.3 | — | 0.7 | — | — |
| Example 18 | 0.9 | 1.8 | — | 0.135 | — | — | 0.015 | — | 0.3 | — | 0.7 | — | — |
| Example 19 | 0.4 | 2.5 | 0.025 | — | — | — | 0.025 | — | 0.5 | — | 0.5 | — | — |
| Example 20 | 0.3 | 2.5 | 0.05 | — | — | — | 0.05 | — | 0.5 | — | 0.5 | — | — |
| Example 21 | 2.05 | 0.05 | — | 0.15 | — | — | 0.15 | — | — | — | 0.55 | 0.55 | — |
| Example 22 | 1.9 | 1 | — | 0.04 | — | — | — | 0.01 | — | — | 0.3 | 0.7 | — |
| Example 23 | 2.55 | 0 | 0.135 | — | — | — | 0.015 | — | 0.383 | — | 0.457 | — | 0.21 |
| Example 24 | 0.8 | 2 | 0.05 | — | — | — | 0.05 | — | 0.5 | — | — | 0.5 | — |
| Example 25 | 2.7 | 0 | 0.12 | — | — | — | 0.03 | — | 0.5 | — | 0.4 | — | 0.1 |
| Example 26 | 0.6 | 2 | 0.1 | — | — | — | 0.1 | — | 1 | — | — | — | — |
| Example 27 | 0.5 | 2 | 0.05 | — | — | — | 0.05 | — | 1.1 | — | — | — | — |
| Example 28 | 0.3 | 2 | 0.1 | — | — | — | 0.1 | — | 1.1 | — | — | — | — |
| Example 29 | 1.1 | 1.8 | — | 0.045 | — | — | 0.005 | — | 0.2 | — | 0.8 | — | — |
| Example 30 | 1.1 | 1.8 | — | 0.035 | — | — | 0.015 | — | 0.2 | — | 0.8 | — | — |
| Example 31 | 0.5 | 2.3 | — | 0.09 | — | 0.01 | — | — | 0.3 | — | 0.7 | — | — |
| Example 32 | 1.3 | 1.6 | — | 0.04 | — | 0.01 | — | — | — | 0.1 | 0.9 | — | — |
| Example 33 | 1 | 1.9 | — | 0.035 | — | 0.015 | — | — | 0.1 | — | 0.9 | — | — |
| Example 34 | 1 | 1.9 | — | 0.035 | — | 0.015 | — | — | 0.6 | — | 0.4 | — | — |
| Example 35 | 2.3 | 0.4 | — | 0.105 | — | 0.045 | — | — | — | 0.6 | 0.4 | — | — |
| Example 36 | 0.6 | 2.1 | — | 0.135 | — | 0.015 | — | — | — | 0.2 | 0.8 | — | — |
| Example 37 | 2.7 | — | 0.05 | 0.055 | — | 0.045 | — | — | — | 0.6 | 0.4 | — | — |
| Comparative Example 1 | — | 2.8 | — | 0.1 | — | — | — | — | 0.5 | — | 0.5 | — | — |
| Comparative Example 2 | 0.3 | 2 | 0.2 | — | — | — | — | — | 1.1 | — | — | — | — |

TABLE 2

| Example | Composition | M1 | M2 | a | b | x | y | z | Ion conductivity (mS/cm) |
|---|---|---|---|---|---|---|---|---|---|
| Example 1 | Li$_{2.6}$C$_{a0.18}$Zn$_{0.02}$Y$_{0.3}$Gd$_{0.7}$Br$_{2.5}$Cl$_{3.5}$ | Ca, Zn | Y, Gd | 0.2 | 0 | 0.1 | 0.7 | 3.5 | 2.49 |
| Example 2 | Li$_{2.7}$C$_{a0.12}$Zn$_{0.03}$Y$_{0.4}$Gd$_{0.6}$Br$_3$Cl$_3$ | Ca, Zn | Y, Gd | 0.15 | 0 | 0.2 | 0.6 | 3 | 2.42 |
| Example 3 | Li$_{2.55}$C$_{a0.075}$Zn$_{0.075}$Y$_{0.525}$Gd$_{0.525}$Br$_2$Cl$_4$ | Ca, Zn | Y, Gd | 0.15 | 0.05 | 0.5 | 0.5 | 4 | 1.90 |
| Example 4 | Li$_{2.7}$C$_{a0.135}$Zn$_{0.015}$Y$_{0.3}$Gd$_{0.7}$Br$_{2.5}$Cl$_{3.5}$ | Ca, Zn | Y, Gd | 0.15 | 0 | 0.1 | 0.7 | 3.5 | 1.81 |
| Example 5 | Li$_{2.9}$C$_{a0.035}$Zn$_{0.015}$Y$_{0.4}$Gd$_{0.6}$Br$_{2.5}$Cl$_{3.5}$ | Ca, Zn | Y, Gd | 0.05 | 0 | 0.3 | 0.6 | 3.5 | 1.79 |
| Example 6 | Li$_{2.9}$C$_{a0.025}$Zn$_{0.025}$Y$_{0.5}$Gd$_{0.5}$Br$_2$Cl$_4$ | Ca, Zn | Y, Gd | 0.05 | 0 | 0.5 | 0.5 | 4 | 1.75 |
| Example 7 | Li$_{2.4}$C$_{a0.15}$Zn$_{0.015}$Y$_{0.5}$Gd$_{0.5}$Br$_3$Cl$_3$ | Ca, Zn | Y, Gd | 0.3 | 0 | 0.5 | 0.5 | 3 | 1.70 |
| Example 8 | Li$_{2.7}$C$_{a0.12}$Zn$_{0.03}$Y$_{0.4}$Gd$_{0.6}$Br$_2$Cl$_4$ | Ca, Zn | Y, Gd | 0.15 | 0 | 0.2 | 0.6 | 4 | 1.70 |
| Example 9 | Li$_{2.8}$C$_{a0.08}$Zn$_{0.02}$Y$_{0.4}$Gd$_{0.6}$Br$_{2.5}$Cl$_{3.5}$ | Ca, Zn | Y, Gd | 0.1 | 0 | 0.2 | 0.6 | 3.5 | 1.62 |
| Example 10 | Li$_{2.6}$C$_{a0.1}$Zn$_{0.1}$Y$_{0.5}$Gd$_{0.5}$Br$_3$Cl$_3$ | Ca, Zn | Y, Gd | 0.2 | 0 | 0.5 | 0.5 | 3 | 1.31 |
| Example 11 | Li$_{2.9}$C$_{a0.025}$Zn$_{0.025}$Y$_{0.1}$Gd$_{0.9}$Br$_3$Cl$_3$ | Ca, Zn | Y, Gd | 0.05 | 0 | 0.5 | 0.9 | 3 | 1.42 |
| Example 12 | Li$_{2.7}$C$_{a0.12}$Zn$_{0.03}$Y$_{0.9}$Sm$_{0.1}$Br$_2$Cl$_4$ | Ca, Zn | Y, Sm | 0.15 | 0 | 0.2 | 0.1 | 4 | 1.35 |
| Example 13 | Li$_{2.5}$C$_{a0.05}$Zn$_{0.05}$Y$_{0.55}$Sm$_{0.55}$Br$_2$Cl$_4$ | Ca, Zn | Y, Sm | 0.1 | 0.1 | 0.5 | 0.5 | 4 | 1.35 |
| Example 14 | Li$_{2.6}$C$_{a0.1}$Zn$_{0.1}$Y$_{0.5}$Sm$_{0.5}$Br$_2$Cl$_4$ | Ca, Zn | Y, Sm | 0.2 | 0 | 0.5 | 0.5 | 4 | 1.10 |
| Example 15 | Li$_{2.8}$C$_{a0.05}$Zn$_{0.05}$Y$_{0.5}$Sm$_{0.5}$Br$_2$Cl$_4$ | Ca, Zn | Y, Sm | 0.1 | 0 | 0.5 | 0.5 | 4 | 1.03 |
| Example 16 | Li$_{2.6}$C$_{a0.1}$Zn$_{0.1}$YBr$_2$Cl$_4$ | Ca, Zn | Y | 0.2 | 0 | 0.5 | 0 | 4 | 1.48 |
| Example 17 | Li$_{2.8}$C$_{a0.08}$Mg$_{0.02}$Y$_{0.3}$Gd$_{0.7}$Br$_{2.5}$Cl$_{3.5}$ | Ca, Mg | Y, Gd | 0.1 | 0 | 0.2 | 0.7 | 3.5 | 2.07 |
| Example 18 | Li$_{2.7}$C$_{a0.135}$Mg$_{0.015}$Y$_{0.3}$Gd$_{0.7}$Br$_3$Cl$_3$ | Ca, Mg | Y, Gd | 0.15 | 0 | 0.1 | 0.7 | 3 | 2.05 |
| Example 19 | Li$_{2.9}$C$_{a0.025}$Mg$_{0.025}$Y$_{0.5}$Gd$_{0.5}$Br$_{2.5}$Cl$_{3.5}$ | Ca, Mg | Y, Gd | 0.05 | 0 | 0.5 | 0.5 | 3.5 | 1.96 |
| Example 20 | Li$_{2.8}$C$_{a0.05}$Mg$_{0.05}$Y$_{0.5}$Gd$_{0.5}$Br$_{2.5}$Cl$_{3.5}$ | Ca, Mg | Y, Gd | 0.1 | 0 | 0.5 | 0.5 | 3.5 | 1.95 |
| Example 21 | Li$_{2.1}$C$_{a0.15}$Mg$_{0.15}$Y$_{0.55}$Gd$_{0.55}$Br$_2$Cl$_4$ | Ca, Mg | Y, Gd | 0.3 | 0.1 | 0.5 | 0.5 | 4 | 1.00 |
| Example 22 | Li$_{2.9}$C$_{a0.04}$Mg$_{0.01}$Y$_{0.3}$Gd$_{0.7}$Br$_2$Cl$_4$ | Ca, Mg | Y, Gd | 0.05 | 0 | 0.2 | 0.7 | 4 | 1.50 |
| Example 23 | Li$_{2.55}$C$_{a0.135}$Mg$_{0.015}$Y$_{0.84}$Sm$_{0.21}$Br$_2$Cl$_4$ | Ca, Mg | Y, Sm | 0.15 | 0.05 | 0.1 | 0.2 | 4 | 2.09 |
| Example 24 | Li$_{2.8}$C$_{a0.05}$Mg$_{0.05}$Y$_{0.5}$Sm$_{0.5}$Br$_2$Cl$_4$ | Ca, Mg | Y, Sm | 0.1 | 0 | 0.5 | 0.5 | 4 | 1.19 |
| Example 25 | Li$_{2.7}$C$_{a0.05}$Mg$_{0.03}$Y$_{0.9}$Sm$_{0.1}$Br$_{1.5}$Cl$_{4.5}$ | Ca, Mg | Y, Sm | 0.15 | 0 | 0.2 | 0.1 | 4.5 | 1.21 |
| Example 26 | Li$_{2.6}$C$_{a0.1}$Mg$_{0.1}$YBr$_2$Cl$_4$ | Ca, Mg | Y | 0.2 | 0 | 0.5 | 0 | 4 | 1.42 |
| Example 27 | Li$_{2.5}$C$_{a0.05}$Mg$_{0.05}$Y$_{1.1}$Br$_2$Cl$_4$ | Ca, Mg | Y | 0.1 | 0.1 | 0.5 | 0 | 4 | 1.34 |
| Example 28 | Li$_{2.3}$C$_{a0.1}$Mg$_{0.1}$Y$_{1.1}$Br$_2$Cl$_4$ | Ca, Mg | Y | 0.2 | 0.1 | 0.5 | 0 | 4 | 1.05 |
| Example 29 | Li$_{2.9}$C$_{a0.045}$Mg$_{0.005}$Y$_{0.2}$Gd$_{0.8}$Br$_{2.5}$Cl$_{3.5}$ | Ca, Mg | Y, Gd | 0.05 | 0 | 0.1 | 0.8 | 3.5 | 3.12 |
| Example 30 | Li$_{2.9}$C$_{a0.035}$Mg$_{0.015}$Y$_{0.2}$Gd$_{0.8}$Br$_{2.5}$Cl$_{3.5}$ | Ca, Mg | Y, Gd | 0.05 | 0 | 0.3 | 0.8 | 3.5 | 2.71 |
| Example 31 | Li$_{2.8}$C$_{a0.09}$Zn$_{0.01}$Y$_{0.3}$Gd$_{0.7}$Br$_{2.5}$Cl$_{3.5}$ | Ca, Zn | Y, Gd | 0.1 | 0 | 0.1 | 0.7 | 3.5 | 2.71 |
| Example 32 | Li$_{2.9}$C$_{a0.04}$Zn$_{0.01}$Y$_{0.1}$Gd$_{0.9}$Br$_2$Cl$_4$ | Ca, Zn | Y, Gd | 0.05 | 0 | 0.2 | 0.9 | 4 | 2.70 |
| Example 33 | Li$_{2.9}$C$_{a0.035}$Zn$_{0.015}$Y$_{0.1}$Gd$_{0.9}$Br$_2$Cl$_4$ | Ca, Zn | Y, Gd | 0.05 | 0 | 0.3 | 0.9 | 4 | 2.63 |
| Example 34 | Li$_{2.9}$C$_{a0.035}$Zn$_{0.015}$Y$_{0.6}$Gd$_{0.4}$Br$_2$Cl$_4$ | Ca, Zn | Y, Gd | 0.05 | 0 | 0.3 | 0.4 | 4 | 2.57 |
| Example 35 | Li$_{2.7}$C$_{a0.105}$Zn$_{0.045}$Y$_{0.6}$Gd$_{0.4}$Br$_{2.5}$Cl$_{3.5}$ | Ca, Zn | Y, Gd | 0.15 | 0 | 0.3 | 0.4 | 3.5 | 2.54 |
| Example 36 | Li$_{2.7}$C$_{a0.135}$Zn$_{0.015}$Y$_{0.2}$Gd$_{0.8}$Br$_3$Cl$_3$ | Ca, Zn | Y, Gd | 0.15 | 0 | 0.1 | 0.8 | 3 | 2.53 |
| Example 37 | Li$_{2.7}$C$_{a0.105}$Zn$_{0.045}$Y$_{0.6}$Gd$_{0.4}$Br$_2$Cl$_4$ | Ca, Zn | Y, Gd | 0.15 | 0 | 0.3 | 0.4 | 4 | 2.50 |
| Comparative Example 1 | Li$_{2.8}$C$_{a0.1}$Y$_{0.5}$Gd$_{0.5}$Br$_3$Cl$_3$ | Ca | Y, Gd | 0.1 | 0 | 0 | 0.5 | 3 | 0.80 |

TABLE 2-continued

| Example | Composition | M1 | M2 | a | b | x | y | z | Ion conductivity (mS/cm) |
|---|---|---|---|---|---|---|---|---|---|
| Comparative Example 2 | $Li_{2.3}Ca_{0.2}Y_{1.1}Br_2Cl_4$ | Ca | Y | 0.2 | 0.1 | 0 | 0 | 4 | 0.80 |

TABLE 3

| Example | Diffraction angle of third peak (°) | Diffraction angle of fourth peak (°) | Diffraction angle of first peak (°) | Diffraction angle of second peak (°) | Diffraction angle of fifth peak (°) |
|---|---|---|---|---|---|
| Example 1 | 15.24 | 16.62 | 30.25 | 39.37 | 47.05 |
| Example 2 | 15..18 | 16.55 | 30.13 | 39.21 | 46.86 |
| Example 3 | 15.36 | 16.75 | 30.48 | 39.68 | 47.44 |
| Example 4 | 15.29 | 16.66 | 30.28 | 39.4 | 47.09 |
| Example 5 | 15.27 | 16.65 | 30.33 | 39.46 | 47.19 |
| Example 6 | 15.37 | 16.75 | 30.51 | 39.69 | 47.46 |
| Example 7 | 15.21 | 16.58 | 30.19 | 39.28 | 46.94 |
| Example 8 | 15.37 | 16.77 | 30.49 | 39.68 | 47.41 |
| Example 9 | 15.27 | 16.64 | 30.31 | 39.43 | 47.14 |
| Example 10 | 15.21 | 16.59 | 30.17 | 39.26 | 46.88 |
| Example 11 | 15.21 | 16.58 | 30.16 | 39.3 | 46.85 |
| Example 12 | 15.42 | 16.8 | 30.61 | 39.83 | 47.65 |
| Example 13 | 15.37 | 16.77 | 30.53 | 39.72 | 47.49 |
| Example 14 | 15.41 | 16.8 | 30.56 | 39.76 | 47.53 |
| Example 15 | 15.38 | 16.77 | 30.53 | 39.72 | 47.52 |
| Example 16 | 15.39 | 16.78 | 30.55 | 39.74 | 47.52 |
| Example 17 | 15.16 | 16.63 | 30.67 | 39.89 | 46.91 |
| Example 18 | 15.27 | 16.63 | 30.31 | 39.42 | 47.14 |
| Example 19 | 15.18 | 16.57 | 30.13 | 39.24 | 46.88 |
| Example 20 | 15.28 | 16.66 | 30.33 | 39.48 | 47.17 |
| Example 21 | 15.27 | 16.64 | 30.32 | 39.44 | 47.16 |
| Example 22 | 15.33 | 16.76 | 30.47 | 39.69 | 47.36 |
| Example 23 | 15.37 | 16.75 | 30.5 | 39.67 | 47.44 |
| Example 24 | 15.38 | 16.76 | 30.56 | 39.76 | 47.56 |
| Example 25 | 15.35 | 16.71 | 30.46 | 39.62 | 47.4 |
| Example 26 | 15.5 | 16.9 | 30.76 | 40.03 | 47.85 |
| Example 27 | 15.42 | 16.8 | 30.56 | 39.76 | 47.51 |
| Example 28 | 15.38 | 16.78 | 30.54 | 39.74 | 47.5 |
| Example 29 | 15.39 | 16.82 | 30.56 | 39.78 | 47.47 |
| Example 30 | 15.26 | 16.61 | 30.27 | 39.35 | 47.06 |
| Example 31 | 15.39 | 16.75 | 30.43 | 39.52 | 47.23 |
| Example 32 | 15.35 | 16.72 | 30.37 | 39.52 | 47.17 |
| Example 33 | 15.4 | 16.78 | 30.56 | 39.75 | 47.48 |
| Example 34 | 15.45 | 16.84 | 30.56 | 39.72 | 47.44 |
| Example 35 | 15.38 | 16.75 | 30.51 | 39.68 | 47.47 |
| Example 36 | 15.29 | 16.7 | 30.41 | 39.55 | 47.27 |
| Example 37 | 15.24 | 16.6 | 30.15 | 39.21 | 46.87 |

Consideration

The solid electrolyte materials of Examples 1 to 37 have high lithium-ion conductivities of 1 mS/cm or more at around room temperature.

As obvious by comparing Examples 1 to 37 with Comparative Examples 1 and 2, when the solid electrolyte material consists of Li, M1, M2, and X; M1 is at least two selected from the group consisting of Ca, Mg, and Zn; M2 is at least one selected from the group consisting of Y, Gd, and Sm; and X is at least one selected from the group consisting of F, Cl, Br, and I, the solid electrolyte material has a higher ion conductivity than when the configuration is different from the above. It is inferred that this is because a pathway for diffusing lithium ions is easily formed.

As obvious from Examples 1 to 16 and 31 to 37, when M1 is Ca and Zn, the solid electrolyte material has a high ion conductivity. It is inferred that this is because a pathway for diffusing lithium ions is easily formed.

In the composition formula (1), when the value of "a" is larger than 0 and 0.3 or less, the solid electrolyte material has a high ion conductivity. It is inferred that this is because a pathway for diffusing lithium ions is easily formed.

In the composition formula (1), when the value of "b" is larger than 0 and 0.1 or less, the solid electrolyte material has a high ion conductivity. It is inferred that this is because a pathway for diffusing lithium ions is easily formed.

In the composition formula (1), when the value of "x" is larger than 0 and 0.5 or less, the solid electrolyte material has a high ion conductivity. It is inferred that this is because a pathway for diffusing lithium ions is easily formed.

In the composition formula (1), when the value of "y" is 0 or more and 0.9 or less, the solid electrolyte material has a high ion conductivity. It is inferred that this is because a pathway for diffusing lithium ions is easily formed.

As obvious from Examples 17 to 30, when M1 is Ca and Mg, the solid electrolyte material has a high ion conductivity.

In the composition formula (1), when the value of "z" is 3 or more and 4.5 or less, the solid electrolyte material has a high ion conductivity. It is inferred that this is because a pathway for diffusing lithium ions is easily formed.

As obvious from FIGS. 4 and 5, in the X-ray diffraction patterns of the solid electrolyte materials of Examples 1 to 37, when a first peak, a second peak, a third peak, a fourth peak, and a fifth peak are present, the solid electrolyte material has a high ion conductivity. It is inferred that this is because the formation of a pathway for diffusing lithium ions is more facilitated.

In all of Examples 1 to 37, the batteries were charged and discharged at room temperature.

Since the solid electrolyte materials of Examples 1 to 37 do not contain sulfur, hydrogen sulfide is not generated.

As described above, the solid electrolyte material according to the present disclosure has a high lithium-ion conductivity and is suitable for providing a battery that can be well charged and discharged.

The solid electrolyte material of the present disclosure is used in, for example, an all-solid-state lithium-ion secondary battery.

What is claimed is:

1. A solid electrolyte material consisting of:
Li, M1, M2, and X, wherein
M1 is at least two selected from the group consisting of Ca, Mg, and Zn;
M2 is at least one selected from the group consisting of Y, Gd, and Sm;
X is at least one selected from the group consisting of F, Cl, Br, and I; and
in an X-ray diffraction pattern obtained by X-ray diffraction measurement of the solid electrolyte material using Cu-Kα rays:
there is a first peak in a diffraction angle 2θ range of 30.0° or more and 31.0° or less,
there is a second peak in a diffraction angle 2θ range of 39.0° or more and 40.3° or less,
there is a third peak in a diffraction angle 2θ range of 15.0° or more and 15.7° or less,
there is a fourth peak in a diffraction angle 2θ range of 16.3° or more and 17.1° or less, and
there is a fifth peak in a diffraction angle 2θ range of 46.6° or more and 48.1° or less.

2. The solid electrolyte material according to claim 1, wherein
M1 is Ca and Mg or is Ca and Zn.

3. The solid electrolyte material according to claim 1, wherein
X is at least one selected from the group consisting of Cl and Br.

4. The solid electrolyte material according to claim 1, represented by a following composition formula (1):

$$Li_{3-2a-3b}(Ca_{1-x}M1'_x)_a(Y_{1-y}M2'_y)_{1+b}Br_{6-z}CL_z \quad (1)$$

here,
M1' is at least one selected from the group consisting of Zn and Mg;
M2' is at least one selected from the group consisting of Gd and Sm; and
following five mathematical expressions:
$0 < a \leq 0.3$;
$0 \leq b \leq 0.1$;
$0 < x \leq 0.5$;
$0 \leq y \leq 0.9$; and
$0 \leq z \leq 6$
are satisfied.

5. A battery comprising:
a positive electrode;
a negative electrode; and
an electrolyte layer disposed between the positive electrode and the negative electrode, wherein
at least one selected from the group consisting of the positive electrode, the negative electrode, and the electrolyte layer contains the solid electrolyte material according to claim 1.

* * * * *